Feb. 16, 1943.　　　E. W. KELLOGG　　　2,311,444
LIGHT PROJECTING DEVICE
Filed Jan. 2, 1940
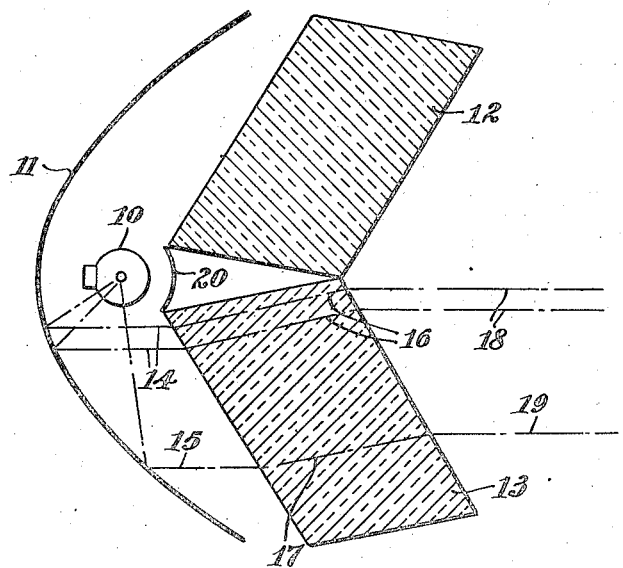
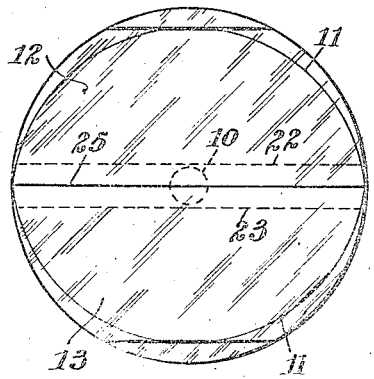
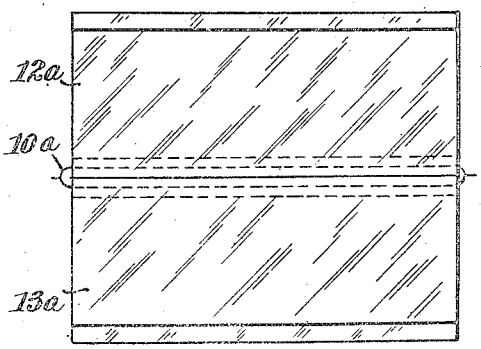
Inventor
Edward W. Kellogg,
By
Attorney Patented Feb. 16, 1943

2,311,444

UNITED STATES PATENT OFFICE 2,311,444

LIGHT PROJECTING DEVICE

Edward W. Kellogg, Moorestown, N. J., assignor to Radio Corporation of America, a corporation of Delaware Application January 2, 1940, Serial No. 312,081

1 Claim. (Cl. 240—41.3)

This invention relates to a light projecting device or optical condensing system for directing the light from a source in the form of a beam.

In many forms of optical apparatus, it is necessary to secure a beam of light of high intensity and of uniform brightness. Heretofore, this has been accomplished by the use of a condensing lens or lenses which direct the light emerging from the source in the form of a beam of parallel or converging or diverging light.

An elliptic or a parabolic reflector may have a very large aperture, which gives it a superiority over a lens for the purpose, but the light source necessarily lies between the reflector and the beam of light directed thereby. If a beam of parallel or divergent light is produced by the reflector, the light source with its mounting and with its usual envelope produces a dark shadow in the middle of the beam. A parabolic reflector, therefore, has only been usable heretofore under conditions which do not require a perfectly uniform or solid source. A uniform source might be imaged for example in the plane of the picture aperture of a projector, whereas a non-uniform source must be imaged in the projection lens or at approximately in the plane thereof, and this is less efficient.

In the present invention, the foregoing disadvantages of a parabolic or elliptic reflector are avoided by the use of a pair of plane parallel refracting members so located and arranged as to shift the two halves of the beam toward each other, thereby eliminating the central dark spot. These refractors are preferably made in the form of rhombic prisms in contact with each other at their outer faces and spaced at their inner faces by an amount equal to the diameter of the light source and of such thickness that the lateral displacement of the beams is at least half the width of the light source.

One object of the invention is to provide an improved source of uniform illumination.

Another object of the invention is to provide an improved optical condensing system.

Another object of the invention is to provide apparatus for eliminating the dark spot from the beam of light projected by a parabolic or by an elliptic reflector.

I have chosen to illustrate my invention as applied to a parabolic mirror.

Other and incidental objects of the invention will be apparent to those skilled in the art from a reading of the following specification and an inspection of the accompanying drawing in which:

Figure 1 is a section taken along the optical axis of a light projection system made in accordance with my invention, Figure 2 is a front view of the apparatus shown in Fig. 1 as applied to a circular parabolic mirror with a concentrated light source, and Figure 3 is a front view of an optical system made in accordance with Fig. 1, but as applied to a linear light source and using a trough shaped elliptic or parabolic mirror.

Referring first to Fig. 1, the light source is indicated at 10 and is located at the focus of the parabolic or elliptic reflector 11. This reflector reflects light from the source 10 in the form of parallel rays, as indicated at 14 and 15. It will be apparent that the envelope of the source 10, as well as its base and mounting, will interfere with light reflected from the mirror 11 and produce a dark spot in the middle of the beam. The rhombic prisms made of any appropriate transparent material such as glass or one of the transparent plastic compositions are accordingly provided. These prisms meet at their outer faces and are separated sufficiently at their inner faces to avoid the obstruction of the light source 10.

The parallel light ray 14 striking the inner face of the prism 13 are refracted in the form of parallel rays as indicated at 16 and emerge from the other face of the prism still as parallel rays, but displaced an amount determined by the thickness, index of refraction, and angle of the prism, the rays 18 being parallel to the original rays 14. Likewise, the ray 15 is refracted as indicated at 17 and emerges as indicated at 19, parallel with the rays 18. The same shifting of the rays applies to all the rays incident on both refractors 12 and 13. It will be apparent that this has the effect of closing up the gap in the light beam which would be caused by the interfering envelope of the source 10. Some of the light which would otherwise be lost may be reflected back to the reflector 11 by another appropriate reflector such as indicated at 20 located between the inner faces of the prisms 12 and 13.

Although the invention is illustrated as applied to the production of a beam of parallel light, it will be apparent that it may likewise be applied to a diverging or converging beam.

It will also be apparent that a single refractor may be used over one half of the beam, this refractor being of sufficient thickness and at such an angle to shift that half of the beam and amount corresponding to the full width of the light source. This arrangement is not so desirable, since the thicker refractor required would limit the light rays, and owing to losses of light at the extra glass surfaces the issuing light would be slightly brighter on one side than on the other.

When the invention is applied to a reflector which is a surface of revolution as used with a concentrated light source, the front appearance of the apparatus is as shown in Fig. 2 where the outer edge of the reflector 11 appears above and below the edges of the prisms, the inner edges 22, 23 are not visible nor is the envelope of the light source 10. Only the thin line 25 where the outer edges come together breaks the otherwise complete uniformity of the source.

It will be apparent that the invention is just as applicable to a linear source of light as it is to a concentrated source and, in this case, the light source, which may be a linear filament or an elongated vapor lamp, is indicated in Fig. 3 at 10a. The reflector in this arrangement is trough shaped and the rhombic prisms 12 and 13, run the full length of the elliptic or parabolic mirror.

It will be apparent that in either form of the invention, although a certain amount of light is lost at the middle of the beam the two halves of the beam are refracted toward each other so that the emergent beam is of perfectly uniform brightness and has neither a dark spot nor any excessively bright spot in the middle, as has been heretofore the case with reflected beams.

Having now described my invention, I claim:

In combination, a concave focalizing reflector, a light source located substantially at the focus thereof, two plane refractors, each having oppositely parallel faces, located in front of and diverging outwardly from said light source, said refractors meeting in a line perpendicular to the longitudinal axis of said reflector, the adjoining lower face of the upper refractor and the upper face of the lower refractor forming an acute angle facing said light source and bisected by the axis of the reflector, the two front faces of said refractors forming an obtuse angle bisected by said axis, and a curved reflector centered on and facing said light source and disposed within the acute angle formed by said refractors.

EDWARD W. KELLOGG.